United States Patent Office 3,294,721
Patented Dec. 27, 1966

3,294,721
COATING COMPOSITIONS COMPRISING EPOXY RESIN FATTY ACID ESTER-HYDROCARBON RESIN REACTION PRODUCTS
William J. Belanger, Louisville, Ky., assignor, by mesne assignments, to Devoe & Raynolds Company, Inc., New York, N.Y., a corporation of Delaware
No Drawing. Filed June 4, 1963, Ser. No. 285,226
6 Claims. (Cl. 260—23.7)

This invention, in one of its aspects, relates to modified epoxy ester compositions. In another of its aspects, the invention relates to compositions which can be used as coatings for metals, for instance as automotive and appliance primers, as zinc welding primers, as can coatings, etc.

Esterified epoxide resins are used in the formulation of many air-drying and baking finishes because through modification of epoxy resins with fatty acids, coating compositions having a wide variety of properties can be made. Epoxy esters are employed as vehicles in general purpose enamels, trim and trellis paints, floor finishes, metal cabinet enamels, industrial baking finishes and the like. In addition, epoxy ester based primers are now widely used in the auto industry. A good primer is essential in the development of most coating systems, and this is particularly true in the automotive industry.

An object of this invention is to provide a vehicle for an automotive primer.

Another object of this invention is to provide a coating for use in the field of industrial and maintenance finishes.

A further object of this invention is to provide a means for modifying epoxy esters employed as coatings vehicles to improve film performance.

In the formation of epoxy esters, any organic acid will react with an epoxide resin to form the ester. However, epoxy esters of major importance are esters wherein rosin, roisin acids, and fatty acids have been employed such as soya, linseed, and tall oil acids, or mixtures of these acids, in many cases with small amounts of aromatic acids or anhydrides such as phthalic anhydride, hexahydrophthalic acid and the like, or such aliphatic acids as azelaic acid, dimerized drying oil acids and other dibasic acids. Such epoxy esters are now very well known. They have been marketed for quite a few years and they are described in such patents as U.S. 2,456,408, U.S. 2,493,486, U.S. 2,500,765, and U.S. 2,653,141, which are incorporated herein by reference. By proper selection of type and amount of acid, a range of epoxy esters can be made which includes long, medium, and short oil compositions with drying, including semi-drying, characteristics.

Introduction of ester groups in an epoxy resin molecule imposes limitations on solvent, acid and alkali resistance. In accordance with this invention, modified epoxy ester compositions are provided which have not only improved solvent, alkali and acid resistance properties, but form faster drying coatings. These faster drying compositions will be more widely used than epoxy esters since they are suitable for applications where epoxy esters have not previously been utilized. To produce the modified epoxy ester compositions of this invention, epoxy esters having drying, including semi-drying, properties are co-reacted with 10 to 50 weight percent of an unsaturated hydrocarbon resin. The modification thus contemplates a chemical combination of the epoxy ester containing, say, 30 to 60 percent drying or semi-drying oil acids, preferably 40 to 55 percent, and the unsaturated hydrocarbon resin.

Hydrocarbon resins are well-known and are made by polymerizing fractions of coal-tar distillates containing either coumarone or indene, or petroleum distillates containing cyclopentadiene or piperylene. These fractions or distillates are either homopolymerized or copolymerized with such unsaturated hydrocarbons as ethylene, isobutylene, styrene and the like. Hydrocarbon resins are sold commercially as "Picco," "Piccopale," "Chemprene," "Paraprene," "Stygene." Hydrocarbon resins are described in such publications as "Official Digest," May 1956, page 372; Organic Coating Technology, volume I, published 1954, John Wiley and Sons, page 188; U.S.P. 3,024,213, 3,011,883, 2,648,640, and 2,809,948. Rather than lengthening the disclosure with a further description of these recognized hydrocarbon resins, the forelisted publications are incorporated herein by reference. Any of the hydrocarbon resins disclosed in these publications can be used with one exception. As indicated hereinbefore, the hydrocarbon resin is chemically combined with the ester. This reaction takes place through the unsaturation in the epoxy ester with polymerizable double bonds in the hydrocarbon resin. Hydrocarbon resins have several types of double bonds other than aromatic double bonds. Some of these can be oxidized or air bodied while others cannot. Hence, polymerizable hydrocarbon resins which are capable of being oxidized or bodied by reaction with air are those which are contemplated in this invention. However, this contemplates most hydrocarbon resins. Considering unsaturated hydrocarbon resins, preferred resins are those hydrocarbon resins having softening points below 250° F. and iodine values of 100 to 300.

It is understood that since the epoxy ester having drying properties and the hydrocarbon resin both contain various types and degress of unsaturation, the co-reaction must be controlled to prevent gelation. One of the advantages of preparing modified epoxy ester compositions according to the practice of this invention is that in addition to properties obtained from various epoxy esters and hydrocarbon resins, a variety of polymeric products can be made depending on the degree of polymerization, or the extent of co-reaction. The epoxy ester and hydrocarbon resin are heat reacted at a temperature in the range of 480° F. to 600° F. preferably 500° F. to 560° F. The desired degree of polymerization will, however, depend upon the co-reaction period. Since the co-reaction period will vary not only with various hydrocarbon resins and epoxy esters but also with the extent of co-reaction desired, as determined by one skilled in the art, no definite time can be given herein. Normally, the two resins will be heated at the desired temperature for a period of 4 to 12 hours. The usual practice in carrying out such reactions is to determine the course of the reaction by making viscosity determinations. For example, periodically during the co-reaction period a sample will be taken and dissolved in a solvent such as xylene or 75 percent aliphatic-25 percent aromatic hydrocarbon mixture to form a 50 percent nonvolatile solids (NVS) composition. The viscosity increase using 50 NVS compositions is then determined as the reaction proceeds. Such being the practice, extent of co-reaction can best be stated in terms of the initial viscosity, that is, the reduced viscosity at 50 percent solids concentration in xylene. As a general rule, it can be stated that the co-reaction is carried out at the temperature in the indicated range and for a period such that the initial viscosity, measured in poises at 50 percent solids solution in xylene, is increased at least four fold at the same solids concentration. In other words, the co-reaction is carried out until the reduced or solution viscosity is at least four times the initial viscosity of the epoxy ester-hydrocarbon resin mixture, the solids concentration being at 50 percent in xylene in each case. The co-reaction should, of course, not be conducted so long that the modified epoxy ester reaches the gel point. As a guide, the extent of co-reaction will normally not be permitted to proceed beyond a viscosity of 2,500 centipoises.

The invention as described thus far contemplates the reaction of an epoxy ester with a hydrocarbon resin under the conditions set forth herein. It is understood, however, that the epoxide resin itself, the drying oil acids, and the hydrocarbon resin can all be introduced into a reaction vessel at the same time. Since the reaction of the drying oil acids with the epoxide resin takes place at a much faster reaction rate than the polymerization reaction, the two can be reacted first until a low acid number is obtained. The viscosity of the composition is then determined and the composition is heated at the higher temperature to produce the hydrocarbon modified epoxy ester.

Certain hydrocarbon resins, particularly the vinyl-cyclohexene type are incompatible when mixed with epoxy esters. In accordance with one embodiment of this invention, such hydrocarbon resins nevertheless can be used herein. It has been found that on co-reacting the two resins by the practice of this invention, clear modified epoxy ester compositions are obtained having chemical resistance properties rendering them eminently suitable for use in automotive primers and can coatings.

The following description and examples further illustrate the invention, but it will be understood that the invention is not limited thereto. By the descriptive word "parts" used in these examples, it is understood to mean parts by weight unless otherwise designated. By the percent drier used in these examples, it is meant the amount of drier expressed as weight percent of metal based on total resin solids.

The hydrocarbon resins used in the examples of this invention are listed in Table A. The commercial solvent mixtures which are utilized in this invention are listed in Table B.

570° F. in 2 hours and 15 minutes. Water of esterification is removed during the reaction by means of the Dean-Stark apparatus using 60 to 75 parts of Solvent *b* as azeotropic solvent medium. After heating the reactants for an additional 1 hour and 50 minutes, at 550° F. to 570° F., the acid value is found to be 4.5. The Gardner-Holdt viscosity at 50 percent solids in a solvent mixture of 75 percent of Solvent *a* and 25 percent of Solvent *b*, expressed in centipoises is 250 to 275. The reactants are further heated at 550° F. for 2 hours and 50 minutes at which time the viscosity has reached 1070 to 1290 centipoises (a 4.5 fold increase) and the acid value is 2.3.

A 50 percent solution is prepared from this resinous product and a solvent mixture of 75 percent Solvent *a* and 25 percent Solvent *b*. Films prepared from this solution with 0.02 percent rare earth driers and 0.005 percent manganese driers, cure to hard, tough, flexible films after a 15 minute bake at 300° F.

EXAMPLE 2

To the same equipment as described in Example 1 are added 705.6 parts of tall oil fatty acids, 705.6 parts of cottonseed oil acids, 460.2 parts of Hydrocarbon Resin A and 1196.4 parts of the epoxide resin used in Example 1. Heat is applied raising the temperature to 350° F. in 50 minutes. At this temperature, the solid reactants have melted. 2.39 parts of sodium benzoate are added as esterification catalyst and a carbon dioxide gas blanket is introduced into the flask. The temperature is raised to 540° F. in one hour. After holding the temperature at 540° F. to 550° F. for 2 hours and 10 minutes, the viscosity in centipoises is 140 to 165 at 50 percent solids in a solvent mixture of 75 percent Solvent *a* and 25 percent Solvent *b*, and the acid value is 10.7. The temperature is held at 550° F. for 4 hours and 15 minutes, at which time the viscosity is 300 to 320 centipoises and the acid value is 5.2. An additional 3 hours heating at 520° F.

TABLE A.—HYDROCARBON RESINS

| Resin | Melting Point (Ball & Ring) °F. | Viscosity, 70% Solids in Toluene Expressed in Centipoises | Gardner Color, 70% Solids In Toluene | Iodine Number | Specific Gravity, 25° C. | Type | Commercial Name |
|---|---|---|---|---|---|---|---|
| A | 240±5 | 627-884 | 9-11 | 138 | 1.085 | Substituted Vinyl Cyclohexene. | Chemprene 235. |
| B | 210 | 470-500 | 9-11 | 138 | | do | Chemprene 210. |
| C | 221 | 627 | Dark | 160 | 1.0996 | do | Paraprene 115. |
| D | | | 12 | 205 | 1.09 | Cyclopentadiene | Pentaprene 115. |
| E | 218±10 | | 14 | 120 | 1.113 | do | Neville LX685. |
| F | 212 | 340 | 12-13 | 135 | 1.10 | do | Neville C-100. |
| G | 221 | 320 | 12-13 | 135 | 1.10 | do | Neville C-115. |

TABLE B.—SOLVENTS

| Solvent | Boiling Point Range, °F. | Description |
|---|---|---|
| Solvent *a* | 313-398 | Commercial high solvency aliphatic hydrocarbon mixture. |
| Solvent *b* | 315-355 | Commercial aromatic hydrocarbon mixture. |
| Solvent *c* | 235-325 | V M & P Naphtha. |

EXAMPLE 1

To a five-liter flask equipped with a temperature recording device, stirrer, Dean-Stark azeotropic distillation apparatus and gas inlet tube are added 451.5 parts of tall oil fatty acids, 451.5 parts of cottonseed oil acids, 1350 parts of Hydrocarbon Resin A and 789.9 parts of epoxide resin. The epoxide resin is the product of epichlorohydrin and has Bisphenol A (p,p'-dihydroxydiphenyl propane) reacted in a molar ratio of 1.22 to 1 and an epoxide equivalent weight of 950. Heat is applied raising the temperature to 350° F. to melt the solid reactants and to promote the esterification reaction. 2.37 parts of sodium benzoate catalyst are added and the reactants are blanketed with carbon dioxide gas. The temperature is then raised to raises the viscosity to 550 to 627 centipoises (a 4 fold increase) and lowers the acid value to 4.3.

Films prepared from a 50 percent solution of the resinous product in the above described solvent mixture and with 0.02 percent rare earth driers and 0.005 percent manganese driers are well cured after 15 minutes heating at 300° F.

EXAMPLE 3

To the same equipment as described in Example 1 are added 918.5 parts of linseed oil acids, 875 parts of Hydrocarbon Resin A, 751.5 parts of the epoxide resin described in Example 1, and 0.8 part of sodium benzoate as esterification catalyst. Heat and a carbon dioxide gas blanket are applied to the flask. The solid reactants are melted after 1 hour at which time the temperature is 240° F. The temperature is raised to 496° F. in 1 hour with 40-50 parts of xylene being added as the azeotropic solvent medium. After 2 hours and 10 minutes at 496° F. to 500° F. the viscosity at 50 percent solids in Solvent *c* is 50 to 65 centipoises and the acid value is 13.4. The viscosity is 275 to 300 centipoises (a 5 fold increase) and the acid value is 7 after an additional 7 hours and 20 minutes at 480° F. to 500° F.

Films prepared from this resin dissolved in Solvent *c* at 50 percent solids and using 0.02 percent rare earth driers and 0.005 percent manganese driers, cure to tough hard films after 15 minutes at 300° F.

EXAMPLE 4

To a stainless steel reaction vessel are added 2253 parts of tall oil fatty acids and 2253 parts of cottonseed oil acids. Agitation is begun and 8 parts of sodium benzoate are added. Stirring is continued for 2 minutes to ensure thorough mixing. Agitation is then stopped and 2945 parts of the epoxide resin described in Example 1 and 2746 parts of Hydrocarbon Resin $a$ are added to the reactor. Inert gas (carbon dioxide) blanketing is begun and heat is applied to melt out the components. The contents are melted after 1 hour heating and at 150° F. agitation is resumed and heat is applied raising the temperature to 500° F. in 2 hours and 30 minutes. Solvent $b$ is used as the azeotropic solvent medium. After an additional 30 minutes heating, the temperature is 502° F., the viscosity of the reactants at 50 percent solids in 25 percent Solvent $b$ and 75 percent Solvent $a$ is 65 to 85 centipoises and the acid value is 17.4. After 3 hours further heating the temperature is 550° F., the viscosity is 140 centipoises and the acid value is 5.3. The temperature is held at 550° F. for 2 hours and 30 minutes with the viscosity reaching 300 to 320 and the acid value is 4.1. The temperature is lowered to 528° F. and is held at 520° F. to 530° F. for 2 hours and 45 minutes. The viscosity reaches 1070 (a 14 fold increase) and the acid value is 3.1 at the end of this heating period.

EXAMPLE 5

Part A.—Hydrocarbon modified epoxy ester

To a stainless steel reactor as used in Example 4 are added 2225 parts of dehydrated castor oil acids and 6.7 parts of sodium benzoate. After thoroughly mixing these components, 3338 parts of the epoxide resin described in Example 1 and 2520 parts of Hydrocarbon Resin A are added to the reactor. The contents are blanketed with carbon dioxide gas and heat is applied to melt out the components. After all the components are melted and at 430° F. agitation is begun. The azeotropic solvent medium is xylene. The temperature is raised to 490° F. in 1 hour. The esterification reaction is over 80 percent completed as indicated by 64 parts of water that have distilled. The viscosity at 40 percent solids in xylene is 32 to 50 centipoises, the acid value is 11.6. The temperature is held at 490° F. to 500° F. for 10 hours, the viscosity reaching 140 to 165 centipoises and the acid value being 0.8. The product when dissolved at 50 percent solids in xylene has a viscosity of 627 to 884 centipoises, weight per gallon of 7.97 pounds, acid value of 0.8, and color 13 to 14.

Part B.—Zinic welding primer

An automotive zinc welding primer is prepared from the hydrocarbon modified epoxy ester. 80 parts of a 50 percent solution of the modified ester in xylene are ground on a 3 roll mill with 20 parts of silica (0.022 micron), 10 parts of soybean derived lecithin surfactant, 2.5 parts of calcium oxide, and 59.5 parts of xylene. This mixture is removed from the mill and 825 parts of zinc dust are added under agitation. 20 parts of a commercial butylated melamine-formaldehyde resin at 50 percent solids in xylene and butanol are blended into this pigmented coating composition. This resin is the reaction product of about 5 mols of formaldehyde and 1 mol of melamine etherified with butanol, having a Gardner-Holdt viscosity at 25° C. of O—R at 60% solids in a solvent mixture of 75% xylene and 25% butanol.

The pigmented composition is further reduced with xylene to spray viscosity by blending 4 parts by volume of the pigmented composition with one part of xylene. The viscosity of the reduced composition is 16 seconds as determined with a No. 4 Ford Cup. Films, 3 to 4 mils in thickness, are sprayed on cold rolled steel panels, and are cured by a 20 minute bake at 350° F. These panels are scribed and are given a standard salt spray test for 400 hours using 5 percent sodium chloride at 95° F. The results of this test are as follows wherein a rating of 10 is perfect and 0 is a complete failure:

Blistering:
    Scribe _____ 10
    Field _____ 9
Corrosion:
    Scribe _____ 8
    Field _____ 8
Creepage _____ 10
Adhesion _____ 7
General appearance _____ 7

EXAMPLE 6

In order to demonstrate the improvement in properties which can be obtained by co-reacting an epoxy ester and a hydrocarbon resin, the following compositions are made:

COMPOSITION a

An epoxy ester, which is the reaction product of 26.7 weight percent tall oil fatty acids, 26.7 percent (weight) cottonseed oil acids and 46.6 weight percent epoxide resin described in Example 1, is heat bodied for 11.5 hours at 550° F. The viscosity at 50 percent solids in a 75/25 mixture of Solvent $a$ and Solvent $b$ is 1070 centipoises, the acid value is 1.4 and Gardner color is 5 to 6.

COMPOSITION b 65 parts of an unbodied epoxy ester of the same composition as used in preparing Composition $a$ are mixed with 35 parts of Hydrocarbon Resin A and this blend is heated for 7 hours at 550° F. The viscosity at 50 percent solids in the same solvent line up as is used in Composition $a$ is 627 to 884 centipoises, acid value is 1.9, and Gardner color is 15 to 16.

COMPOSITION c 65 parts of Composition $a$ are blended with 35 parts of Hydrocarbon Resin A. This blend has a viscosity of 627 to 884 centipoises at 50 percent solids in the same solvents as are used in Composition $a$, the acid value is 1.8, and the color is 11 to 12.

Films are prepared from Compositions $a$, $b$, and $c$, dissolved in a mixture of 75 parts of Solvent $a$ and 25 parts of Solvent $b$ at 50 percent solids using 0.02 weight percent rare earth driers and 0.005 weight percent manganese driers. These films are baked for 15 minutes at 300° F. The film properties are as follows, wherein the solvent resistance is determined by pencil hardness before and after soaking:

| | Composition a (Unmodified) | Composition b (Invention) | Composition c (Blend) |
|---|---|---|---|
| Pencil Hardness | 2B | B | B. |
| Sward Hardness | 8 | 32 | 24. |
| Solvent Resistance (5 min. soak in Solvent c). | 2B→ <7B | B→ B | B→ 2B. |
| Clarity | Clear | Clear | Slightly Hazy. |

As can be seen from these results, Composition $b$, the composition of this invention, is harder and has better solvent resistance than either the unmodified epoxy ester or the blend of epoxy ester and hydrocarbon resin.

EXAMPLE 7

Additional reactions are conducted to demonstrate the improved properties that are obtained from co-reacted epoxy esters and hydrocarbon resins as compared with unmodified epoxy esters and simple blends of epoxy esters and hydrocarbon resins.

COMPOSITION d

Using the same procedure as described in Example 1, 26.7 parts of tall oil fatty acids, 26.7 parts of cottonseed oil acids, 46.6 parts of the epoxide resin described in Example 1, and 53.8 parts of Hydrocarbon Resin G are reacted for 8 hours and 15 minutes at 550° F. to 560° F. to a viscosity of 1070 to 1760 centipoises at 50 percent solids in Solvent b.

COMPOSITION e

An epoxy ester is prepared from 26.7 parts of tall oil fatty acids, 26.7 parts of cottonseed oil acids and 46.6 parts of the epoxide resin described in Example 1. This epoxy ester is heated for 7 hours at 550° F. to 560° F. to a viscosity of 1070 to 1760 centipoises at 50 percent solids in Solvent b. 100 parts of this heat-bodied epoxy ester are blended with 53 parts of Hydrocarbon Resin G.

COMPOSITION f

Using the same procedure as described in Example 1, 26.7 parts of tall oil fatty acids, 26.7 parts of cottonseed oil acids, 46.6 parts of the epoxide resin of Example 1 and 53.8 parts of Hydrocarbon Resin A are reacted at 550° F. to 560° F. for 5 hours and 15 minutes to a viscosity of 1070 to 1760 centipoises at 50 percent solids in Solvent b.

COMPOSITION g 100 parts of an epoxy ester of the same composition as is used in Composition e are blended with 53 parts of Hydrocarbon Resin A.

COMPOSITION h

The heat bodied epoxy ester of Composition e is used per se without any hydrocarbon resin modification.

Films are prepared from Compositions d, e, f, g, and h, dissolved at 50 percent solids in Solvent b, with the addition of 0.03 percent manganese driers, 0.03 percent cobalt driers, and 0.3 percent lead driers. These films are air-dried and tested. The results of the tests are as follows:

| Composition | Dry Time, Minutes | Pencil Hardness | | Solvent Resistance, 5 min. in Toluene | Caustic Resistance, 16 hrs. in 7.5% Caustic Solution | Film Appearance |
| --- | --- | --- | --- | --- | --- | --- |
| | | 1 wk. | 2 wks. | | | |
| d | 110 | B | H | H | No effect | Clear. |
| e | 230 | 2B | HB | B | Sl. effect | Cloudy. |
| f | 60 | B | H | 7B | do | Clear. |
| g | 200 | B | B | Film dissolved | Failed | Cloudy. |
| h | 300 | 3B | B | B | do | Clear. |

Solvent and Caustic Resistance run on films after 2 week air dry.

EXAMPLE 8

Additional compositions are prepared to demonstrate the improvement in properties that are obtained from co-reacted epoxy esters and hydrocarbon resins. The co-reacted compositions are prepared by the same procedure as is described in Example 1 wherein 26.7 parts of tall oil fatty acids, 26.7 parts of cottonseed oil acids and 46.6 parts of the epoxide resin described in Example 1 are reacted with 53.8 parts of hydrocarbon resins listed in Table A at 550° F. to 560° F. to a viscosity of 1070 to 1760 centipoises at 50 percent solids in Solvent b.

Blend compositions are prepared by mixing 100 parts of a heat bodied epoxy ester, which is prepared from 26.7 parts of tall oil fatty acids, 26.7 parts of cottonseed oil acids and 46.6 parts of the epoxide resin of Example 1, with 53.8 parts of hydrocarbon resins.

Films are prepared from the compositions dissolved at 50 percent solids in Solvent b with 0.002 percent rare earth driers and 0.05 percent manganese driers. These films are baked for 15 minutes at 300° F. The comparative hardness and solvent resistance of these films are listed in the following table.

| Hydrocarbon Resin | Co-reacted Composition | | Blend Composition | |
| --- | --- | --- | --- | --- |
| | Pencil Hardness | Solvent Resistance (5 min. soak in Solvent b) | Pencil Hardness | Solvent Resistance |
| A | B | B | B | 3B. |
| B | B | B | B | 4B. |
| C | B | B | B | 3B. |
| D | B | <7B | B | <7B. |
| E | B | 3B | B | 4B. |
| F | B | <7B | B | <7B. |
| G | B | B | B | 4B. |
| J | B | 3B | B | 5B. |
| K | B | <7B | B | <7B. |
| L | B | B | B | 4B. |
| M | B | Film stripped | B | Film stripped. |

EXAMPLE 9

Part A.—Hydrocarbon modified epoxy ester

To a stainless steel reactor as is used in Example 4 are added 1422 parts of tall oil fatty acids, 1422 parts of cottonseed oil acids and 7 parts of sodium benzoate as esterification catalyst. After thoroughly mixing these components, 2492 parts of the epoxide resin described in Example 1 and 2800 parts of Hydrocarbon Resin G are added to the reactor. Heat and a carbon dioxide gas blanket are applied. Agitation is begun as soon as the reactor contents are melted. When the temperature reaches 500° F. water from the esterification reaction begins to distill. The temperature is raised to 549° F. in a 2 hour period. The esterification is over 80 percent complete as evidenced by the distillation of 110 parts of water. The viscosity, expressed in centipoises, is 225 to 250 at 50 percent solids in xylene and the acid value is 8.4. Heating is continued at 545° F. to 555° F. for 6 hours and 20 minutes. The viscosity increases to 1070 to 1290 (a 5 fold increase), the acid value is 3.5 and the Gardner color is 14 to 15.

Part B.—Can coating formulation

This hydrocarbon modified epoxy ester is dissolved in a solvent mixture consisting of 76.7 parts of Solvent b, 16.5 parts of Solvent a and 6.8 parts of methyl amyl alcohol to a 55 percent solids solution. Manganese naphthenate drier (0.03 percent metal) is added. The solution has a viscosity of 150 seconds with a No. 4 Ford Cup at 77° F. 100 parts of this solution is further reduced by the addition of 25 parts of xylene, yielding a 44 percent solids solution having a viscosity of 40 seconds as measured with a No. 4 Ford Cup. This solution is applied by roller coating technique to electrolytic tin plate and is baked for 10 minutes at 400° F.

This coating is compared with a commercial polybutadiene and a commercial epoxy-urea-formaldehyde can coating formulation. The tests are listed in the following table. All resins are baked for 10 minutes at 400° F. and are applied at a film weight of 3.2 mg. per. sq. in. The rating system used in the table is 10 equals perfect and 0 is complete failure.

| Test | Hydrocarbon Modified Epoxy Resin | Epoxy-Urea Formaldehyde Resin | Polybutadiene Resin |
|---|---|---|---|
| Wedge Bend | 6.5 | 7 | 5.5 |
| Reverse Impact, 28 in.-lbs | 9 | 10 | 8.5 |
| Hot Solder, 3 seconds at 600° F | 5 | 9 | 7 |
| Can End Fabrication | 9 | 8 | 8 |
| Can End Boiling Water, 1 hr | 10 | (¹) | 10 |
| Adhesion | 7 | 8 | 7 |

¹ Spot blushing.

As can be seen from this table, the hydrocarbon modified epoxy ester compares favorably with other commercial resins in can coating usage.

The hydrocarbon resin modified epoxy esters of this invention can be utilized in air-dried and baked protective coating systems wherein metallic driers are incorporated in the systems. These modified esters can also be used in combination with alkoxylated urea-formaldehyde resins, methylol triazines and alkoxylated methylol triazine resins, isocyanates and the like, wherein the curing reaction takes place between residual hydroxyls in the modified ester and the active groups of the other resins. These vehicles can be used in clear and in pigmented systems as primers and as top coats.

What is claimed is:

1. A binder composition for use in coating compositions comprising:
   (A) from 10 to 50 weight percent, based on the total weight of said binder composition, of a polymerizably unsaturated hydrocarbon resin, and
   (B) from 90 to 50 weight percent, based on the total weight of said binder composition, of an epoxy resin ester free of unreacted epoxy groups and containing from 30 to 60 weight percent, based on the weight of said ester, of drying oil acids, said epoxy resin being a glycidyl ether of a polyhydric phenol,
said (A) and (B) being heat-reacted to a viscosity, expressed in centipoises at 50% solids solution in xylene, which is at least four times the viscosity of the substantially unreacted mixture of said (A) and (B).

2. A binder composition as described in claim 1 wherein said epoxy resin, said drying oil acids and said polymerizably unsaturated hydrocarbon resin are reacted to an acid value less than 20 to give a reaction mixture wherein substantially complete formation of said epoxy resin ester has been effected with substantially no polymerizably unsaturated hydrocarbon resin-epoxy resin ester reaction, the viscosity of said reaction mixture is determined, and said epoxy resin ester and said polymerizably unsaturated hydrocarbon resin are heat-reacted to a viscosity at least four times the viscosity initially determined for said reaction mixture.

3. A can coating comprising the binder composition of claim 1 in a solvent.

4. A zinc welding paint for use as a metal primer comprising the binder composition of claim 1 dissolved in a solvent in combination with zinc dust.

5. A binder composition as described in claim 1 wherein said drying oil acids are dehydrated castor oil acids which are present in an amount of from 40 to 55 weight percent, based on the weight of said epoxy resin ester, and said polymerizably unsaturated hydrocarbon resin is a vinyl cyclohexene hydrocarbon resin which is present in an amount of from 20 to 40 weight percent, based on the total weight of said binder composition.

6. A coating composition comprising:
   (1) a heat-reaction product, free of unreacted epoxy groups, of from 15 to 20 weight percent of tall oil fatty acids, from 15 to 20 weight percent of cottonseed oil acids, from 30 to 35 weight percent of an epoxy resin, said epoxy resin being a reaction product of epichlorohydrin and p,p'-dihydroxydiphenyl propane in a molar ratio of 1.2–1.25:1, respectively, having an epoxide equivalent weight of 900–1,000, and
   (2) from 30 to 35 weight percent of a polymerizably unsaturated cyclopentadiene hydrocarbon resin having a melting point of 210–225° F. and an iodine number of 130–140,
said (1) and said (2) being reacted at a temperature of from 500 to 560° F. to a viscosity of 1,200–1,300 centipoises at 25° C. as measured in a 50 percent solids solution in xylene, said weight percentages being based on the weight of said composition and totalling 100 percent.

References Cited by the Examiner

UNITED STATES PATENTS

| 2,880,188 | 3/1959 | McKay | 260—23.7 |
| 3,062,771 | 11/1962 | Boenan et al. | 260—33.6 |
| 3,175,991 | 3/1965 | Levine et al. | 260—41 |

FOREIGN PATENTS

| 504,808 | 8/1954 | Canada. |

LEON J. BERCOVITZ, *Primary Examiner.*

R. A. WHITE, *Assistant Examiner.*